3,257,453
**PROCESS FOR PREPARING HALOPHENOXY-
CARBOXYLIC ACIDS**
Roland P. Steinkoenig, Chardon, and Charles E. Entemann, Painesville, Ohio, assignors to Diamond Alkali Company, Cleveland, Ohio, a corporation of Delaware
No Drawing. Filed Apr. 9, 1962, Ser. No. 185,813
6 Claims. (Cl. 260—521)

This invention relates to a new and improved method of preparing halophenoxycarboxylic acids, and more particularly refers to improvements in the preperation of chlorophenoxyacetic acids.

Polyhalophenoxycarboxylic acids such as 2,4-dichlorophenoxyacetic acid (2,4-D), 2,4,5-trichlorophenoxyacetic acid (2,4,5-T) and compounds such as 2-methyl-4-chlorophenoxyacetic acid (MCP) are widely used as herbicides and there has been a continuing desire to produce such compounds economically and efficiently.

Referring particularly to the preparation of 2,4-dichlorophenoxyacetic acid as illustrative of such herbicides, it is known to prepare this material by reacting a sodium salt of 2,4-dichlorophenol and a sodium salt of monochloroacetic acid in water to form the sodium salt of 2,4-dichlorophenoxyacetic acid which then can be acidified to obtain the desired 2,4-dichloropenoxyacetic acid. It is also known to react 2,4-dichlorophenolate and the sodium salt of monochloroacetic acid in a halogenated hydrocarbon or hydrocarbon solvent or diluent. Moreover, it is known to carry out this type of reaction under anhydrous conditions at high temperatures.

However, while such prior methods have produced the desired chemical product, in many instances there has remained a continuing need for a more advantageous process which can be used commercially and economically advantageously to produce one or more of these products in equipment of minimum practicable size, or, conversely stated, to produce a maximum yield in a reactor.

In order to avoid the difficulties heretofore encountered and to provide a new and improved process, the present invention has as one of its principal objects the provision of a new and improved method of producing a halophenoxycarboxylic acid, notably 2,4-dichlorophenoxyacetic acid, in high yield in a manner which avoids the use of an added halogenated hydrocarbon or hydrocarbon solvent or diluent and at the same time avoids the temperature and other difficulties inherently encountered in attempting to carry out the reaction on an anhydrous basis.

The present invention comprises preparing a halophenoxycarboxylic acid by the steps of reacting an alkali and a molten halophenol in a liquid reaction medium consisting of a molten halophenol in the case of preparing 2,4-D, i.e., 2,4-dichlorophenol, and added water to form an alkali metal salt of the halophenol, reacting the thus-formed alkali metal salt with a halocarboxylic acid in proportions providing at least a 100% stoichiometric excess of the alkali metal halophenol salt over the acid whereby the desired reaction product is obtained in high yield and at the same time undesired and wasteful hydrolysis of the acid is minimized, acidifying the reaction mixture, and recovering the desired halophenoxycarboxylic acid from the reaction mixture.

As used in the specification and claims, the term "halophenoxycarboxylic acid" is intended to refer the various halogen derivatives of phenoxycarboxylic acids, such as 2,4-D, 2,4,5-T, MCP, while chloro derivatives are preferred, other halogens and halogen derivatives are contemplated such as bromo, fluoro, iodo and mixed halo products such as, fluorochlorophenoxycarboxylic acids, and the like. The expression "halocarboxylic acid" is intended to refer to various aliphatic halocarboxylic acids; while monochloroacetic acid is preferred, the term also is intended to include materials such as halo, especially chloro-propionic, -butyric, -valeric, -caproic and -heptylic acids.

The term "alkali" as used in the specification and claims is intended to refer especially to an alkali metal hydroxide, preferably sodium hydroxide, although other alkali metal hydroxides, e.g., potassium hydroxide and/or lithium hydroxide can be used. In certain instances alkali metal carbonates, e.g., sodium carbonate, can also be used. It is intended to refer also to other sources of alkali which under the conditions of reaction are suitable to yield the desired high conversion characterizing the practice of this invention and otherwise to be satisfactory. An alkali metal hydroxide, notably sodium hydroxide, is especially preferred. The term "halophenol" is intended to refer to various phenols containing halo substituents, such as 2,4-dichlorophenol which is preferred at present, 2,4,5-trichlorophenol, and the corresponding compounds substituted with other halogens.

It is an important and essential feature of the present invention that the liquid and/or fluid reaction medium consist of a molten halophenol, notably and preferably molten 2,4-dichlorophenol, in an amount sufficient in combination with added water to provide ease of mixing or fluidity, there being no other organic liquid such as a hydrocarbon or a halogenated hydrocarbon added, present, necessary or desired. Moreover, the halophenol liberated in the neutralization of the aliphatic halocarboxylic acid serves to solubilize the alkali metal salt of the polyhalophenoxycarboxylic acid formed and thus aids in fluidizing the reaction mixture. It will be noted that an anhydrous reaction medium is avoided with the attendant avoidance of the higher reaction temperatures otherwise generally required. Further, it will be appreciated that a smaller reactor can be employed for a given production than in many prior processes because no volume-increasing hydrocarbon or halogenated hydrocrabon diluent is necessary to provide fluidity.

Another significant advantage of this invention is that by providing in such a reaction medium at least a 100% stoichiometric excess of the alkali metal salt of the halophenol, it is not necessary to regulate or control the pH of the reaction mixture as heretofore has generally been required. By carefully establishing and initially adding at least, and preferably not significantly more than is dictated by any impurities in the reactants, a 100% stoichiometric excess of the alkali metal hydroxide over the halocarboxylic acid, subsequent pH control of the reaction mixture during the process is not necessary and the alkali required in the reaction is advantageously carried, maintained in usable form and regulated by the presence of the excess molten halophenol, notably 2,4-dichlorophenol, thus serving not only as a means for self control of the reaction but also as part of the reaction medium.

The sequence of reaction steps of this invention are set forth structurally in the following series of equations, it being understood that the sodium hydroxide and the monochloroacetic acid typically are utilized in aqueous form whereby they advantageously are handled by conventional pumping and metering equipment, thus facilitating accurate control of the amounts of reactants employed. However, these reactants or either of them can be used in anhydrous form. It will be appreciated, thus, that water can be or is added with these reactants themselves and water also is formed in the reaction of the alkali with the halophenol. By this combination of factors, a sufficiently fluidized reaction medium is provided without requiring the addition of any other diluent or fluidizing material.

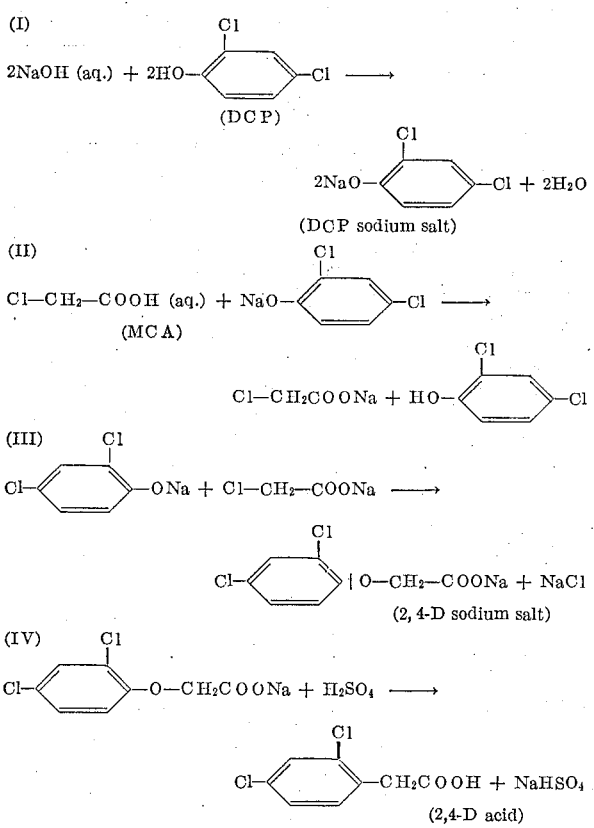

With the practice of the invention as outlined in the foregoing equations, overall reaction yields greater than 90%, based on the 2,4-dichlorophenol consumed and the monochloroacetic acid employed, are obtained. Further, the hydrolysis or loss of monochloroacetic acid (MCA) is minimized since the dichlorophenol and added water serves as an effective, self-regulating alkali carrier wherein the added monochloroacetic acid is never exposed to highly alkaline conditions and, therefore, the need for control of alkalinity via pH is eliminated.

In general, the reaction temperature involved is about 100° C., the reaction temperature typically varying from 100° C. to 110° C. as dictated by the reflux temperature at atmospheric pressure of the reaction medium consisting of water and halophenol. The reaction time typically is 1 to 2 hours although in commercial operations a longer reaction time of say up to 8 hours is not disadvantageous with respect to the high yield obtained.

The proportions of the reactants generally can be varied somewhat so long as at least a 100% stoichiometric excess of the alkali metal hydroxide and the molten halophenol with respect to the halocarboxylic acid is provided. Thus, molar ratios from about 2 to 5 moles of alkali metal hydroxide, notably sodium hydroxide, 2 to 5 moles of dichlorophenol to 1 mole of monochloroacetic acid are typical, it being preferred to operate as close to a 2:2:1 ratio as feasible depending upon the purity of the reactants in order to provide the optimum overall operating conditions. Glass-lined equipment can advantageously be employed although this is not necessary, stainless steel or cast iron equipment also being suitable.

In order that those skilled in the art may more completely understand the present invention and the preferred methods by which the same may be carried into effect, the following specific examples are offered:

There are combined in a reactor 50% aqueous sodium hydroxide (2.2 moles) and molten 2,4-dichlorophenol (2.2 moles) at 50° to 80° C. (the additional .2 mole of dichlorophenol and sodium hydroxide being conveniently added where minor and variable concentrations of residual hydrogen chloride may be present in the monochloroacetic acid. Otherwise, this additional .2 mole of a reactant can be eliminated). There is then added 80% aqueous monochloroacetic acid gradually over a period of 15 minutes at 100° C. The resulting mixture is refluxed for 1 to 3 hours at a temperature ranging from 105° to 110° C. Additional water can then be added if desired.

To neutralize the thus-formed sodium salt, sulfuric acid is then added, generally in a slight stoichiometric excess over the original alkali equivalent, to form the free 2,4-dichlorophenoxyacetic acid. The aqueous phase is then separated, typically by decantation, and the organic layer is washed with hot water with vigorous agitation. The aqueous phase again is separated by decantation and the resulting organic phase containing the 2,4-dichlorophenoxyacetic acid is subjected to steam distillation to eliminate any unreacted or unconsumed 2,4-dichlorophenol, which is recovered. The resultant 2,4-dichlorophenoxyacetic acid is then recovered, preferably by flaking from the molten product resulting from steam distillation to obtain an overall yield of 2,4-dichlorophenoxyacetic acid greater than 90% based on the monochloroacetic acid or dichlorophenol consumed. Alternatively, although less preferred at present, the reaction mixture can be steam distilled to separate the excess dichlorophenol and the 2,4-D filtered off, washed with water and dried.

In the following examples carried out in the manner indicated the results are indexed comparatively.

EXAMPLES

|  | 1 | 2 | 3 | 4 | 5 | 6 | 7 | 8 |
|---|---|---|---|---|---|---|---|---|
| Mole Ratio (NaOH/MCA DCP/MCA) | 2.2/1 | 4.7/1 | 2.2/1 | 2.2/1 | 2.2/1 | 2.2/1 | 2.2/1 | 2.2/1 |
| Conditions: |  |  |  |  |  |  |  |  |
| Reaction time, (hrs.) | 0.25 | 0.25 | 0.5 | 1.0 | 2.0 | 3.0 | 3.0 | 6.0 |
| Reaction temperature (° C.) | 105 | 105 | 105 | 105 | 105 | 105 | 105 | 105 |
| Results, Yield of 2,4-D (crude): |  |  |  |  |  |  |  |  |
| Grams | 37.0 | 20.5 | 39.1 | 40.7 | 41.4 | 42.0 | 41.1 | 41.0 |
| Moles | .168 | .0928 | .177 | .187 | .187 | .190 | .186 | .185 |
| Percent of theory on MCA | 84.0 | 98.7 | 88.6 | 92.2 | 93.7 | 95.1 | 93.0 | 92.5 |
| DCP Recovered, moles | .256 | .323 | .239 | .204 | .250 | .231 | .241 | .236 |
| DCP Efficiency [1] (percent) | 95.8 | 94.3 | 94.4 | 87.9 | 98.7 | 95.4 | 98.4 | 95.4 |

Reactants:
DCP, moles: 0.442.
NaOH, moles: 0.440.
MCA, moles: 0.200 (except Ex. 2: 0.0942 mole MCA).
[1] (Moles DCP recovered plus moles 2,4-D) moles DCP charged.

*Example 9*

In a first stainless steel reactor there are combined 50% aqueous sodium hydroxide at a rate of 63 gallons per hour (796 pounds per hour) and molten 2,4-dichlorophenol at a rate of 146 gallons per hour or 1708 pounds per hour. The reaction temperature is maintained at 100° C. and the reactant's residence time is one hour. The heated mixture then is passed to a second reactor of stainless steel wherein 80% aqueous monochloroacetic acid at a rate of 48.2 gallons per hour (535 pounds per hour) is added. The temperature in the second reactor is maintained at 100° C. and the residence time is about 15 minutes. From the second reactor, the reaction mixture is then passed to a third reactor, also maintained at 100° C. wherein a residence time of 2.25 hours is provided. From the third reactor, the reaction mixture is passed to an acidification and wash tank wherein there is added sulfuric acid and water to liberate the desired 2,4-dichlorophenoxyacetic acid, the water being added at the rate of 1280 lbs. per hour (154 gallons per hour or 2.59 gallons per minute). The water temperature and the acidification mass are maintained at 100° C.

From the acidification and wash tank, the acidified material is passed to a decanter in which the organic layer, consisting of dichlorophenol and 2,4-dichlorophenoxyacetic acid, is removed, and passed to a stripper feed tank. From the stripper feed tank, the reaction mixture is then passed at a rate of 1946 pounds per hour to a preheater which raises the temperature to about 170°–180° C. thence through a flash separator and into a dichlorophenol stripping column. From the top of the column there is obtained molten 2,4-dichlorophenol which is passed through a stripping condenser and into a dichlorophenol receiver tank.

From the bottom of the column, there is obtained in substantially pure form the desired 2,4-dichlorophenoxyacetic acid. This molten material is discharged into a glass-lined melt tank at the rate of 946 pounds per hour, the melt tank being maintained at a temperature of 150° C. From the melt tank the molten dry material is delivered to a cylindrical flaker formed of stainless steel. From the flaker, a conveyor transports the flaked material to a storage hopper from which the material can be discharged as desired.

It is to be understood that although the invention has been described with specific reference to particular embodiments thereof, it is not to be so limited since changes and alterations therein may be made which are within the full intended scope of this invention as defined by the appended claims.

What is claimed is:

1. The method of preparing a halophenoxycarboxylic acid which comprises the steps of reacting an alkali and a molten halophenol in a liquid reaction medium consisting of a molten halophenol and water and in the absence of added organic solvent to form an alkali metal salt of the halophenol, reacting said salt with a halocarboxylic acid in proportions providing at least an initial 100% stoichiometric excess of the salt over the acid, whereby loss and hydrolysis of the acid are minimized, and recovering the said halophenoxy carboxylic acid.

2. The method of preparing a polyhalophenoxycarboxylic acid which comprises the steps of reacting an alkali and a molten polyhalophenol in a liquid reaction medium consisting of a molten polyhalophenol and water and in the absence of added organic solvent to form an alkali metal salt of the polyhalophenol, reacting said alkali metal salt with a halocarboxylic acid in proportions providing at least a 100% stoichiometric excess of the alkali metal salt over the acid, whereby loss and hydrolysis of the acid during the reaction are minimized, and recovering the polyhalophenoxycarboxylic acid from the reaction product.

3. The method according to claim 2 wherein the alkali is sodium hydroxide and the polyhalophenol is 2,4-dichlorophenol.

4. The method which comprises combining at least a 100% stoichiometric excess of an alkali-neutralized 2,4-dichlorophenol with monochloroacetic acid to obtain a 2,4-dichlorophenoxyacetic acid sodium salt in a reaction medium consisting of molten alkali-neutralized 2,4-dichlorophenol and added water, whereby loss and hydrolysis of the monochloroacetic acid are minimizezd, the dichlorophenol serving as an alkali carrier whereby during the course of the reaction, the monochloroacetic acid present is always surrounded by an excess of the alkali-neutralized 2,4-dichlorophenol and is not exposed to conditions sufficiently alkaline to hydrolyze the monochloroacetic acid.

5. The method of claim 1 wherein at least one of the reactants is added in the anhydrous form.

6. The method of preparing 2,4-dichlorophenoxyacetic acid which comprises mixing aqueous caustic soda and molten 2,4-dichlorophenol in substantially equal stoichiometric amounts to form sodium 2,4-dichlorophenolate and adding to the thus-formed mixture up to one half the stoichiometric amount of said dichlorophenolate of aqueous monochloroacetic acid to liberate 2,4-dichlorophenol and form the sodium salt of monochloroacetic acid which in turn reacts with the dichlorophenolate to form the sodium salt of 2,4-dichlorophenoxyacetic acid, refluxing the mixture in a liquid reaction medium consisting of molten 2,4-dichlorophenol and water and in the absence of added organic solvent and subsequently neutralizing the refluxed product, acidifying this salt, separating the aqueous phase, washing the organic layer, removing any excess unreacted dichlorophenol and recovering the 2,4-dichlorophenoxyacetic acid by flaking.

References Cited by the Examiner
UNITED STATES PATENTS

| | | | |
|---|---|---|---|
| 2,511,784 | 6/1950 | O'Neal | 260—521 |
| 2,651,659 | 9/1953 | Warren et al. | 260—521 |

LORRAINE A. WEINBERGER, *Primary Examiner.*

CHARLES B. PARKER, *Examiner.*

G. P. D'ANGELO, S. B. WILLIAMS,
*Assistant Examiners.*